(12) United States Patent
Huang (10) Patent No.: US 7,347,504 B1
(45) Date of Patent: Mar. 25, 2008

(54) DECORATIVE SELF PROPELLING SPINNER ATTACHED LIKE A HUBCAP TO THE WHEEL OF A VEHICLE

(75) Inventor: Nan Huang Huang, Rancho Palos Verdes, CA (US)

(73) Assignee: Grand General Accessories Manufacturing Inc., Rancho Dominguez, CA (US)

(*) Notice: Subject to any disclaimer, the term of this patent is extended or adjusted under 35 U.S.C. 154(b) by 78 days.

(21) Appl. No.: 11/172,185

(22) Filed: Jun. 29, 2005

(51) Int. Cl.
*B60B 7/20* (2006.01)

(52) U.S. Cl. .............................. 301/37.25; 301/37.102

(58) Field of Classification Search ............. 301/37.25, 301/108.1, 37.31, 37.32, 37.35, 37.102, 37.101, 301/37.28, 37.26; 40/587
See application file for complete search history.

(56) References Cited

U.S. PATENT DOCUMENTS

| | | | | |
|---|---|---|---|---|
| 6,488,342 B1* | 12/2002 | De Paiva | ................. | 301/108.1 |
| 6,554,370 B2* | 4/2003 | Fowlkes | .................. | 301/37.25 |
| 6,663,187 B2* | 12/2003 | Fitzgerald | ................ | 301/37.25 |
| 6,776,459 B2* | 8/2004 | Fitzgerald | ................ | 301/37.25 |
| 2002/0036426 A1* | 3/2002 | Fowlkes | .................. | 301/37.25 |
| 2004/0183359 A1* | 9/2004 | Fowlkes | ................ | 301/37.101 |
| 2005/0052069 A1* | 3/2005 | Gilly et al. | ................. | 301/6.1 |
| 2005/0146204 A1* | 7/2005 | Kim | ........................ | 301/37.25 |
| 2006/0208559 A1* | 9/2006 | Morris | ..................... | 301/37.25 |

\* cited by examiner

*Primary Examiner*—Russell D. Stormer
*Assistant Examiner*—Kip Kotter
(74) *Attorney, Agent, or Firm*—Thomas I. Rozsa (57) ABSTRACT

The present invention is a decorative spinner which is attached adjacent the wheel of a vehicle so that it covers the wheel hub like a hubcap. The spinner has a base plate which covers the hubcap and by which the spinner is retained adjacent the wheel and a shaft rotatably supported on the base plate. The shaft in turn rotatably supports a central hub having a multiplicity of spinner blades. When the vehicle is in motion, the base plate rotates and the spinner blades rotate relative to the base plate to provide a doubly pleasing effect. When the vehicle is stopped, the spinner blades can continue to rotate.

12 Claims, 7 Drawing Sheets

DECORATIVE SELF PROPELLING SPINNER ATTACHED LIKE A HUBCAP TO THE WHEEL OF A VEHICLE

BACKGROUND OF THE INVENTION

1. Field of the Invention

The present invention relates to decorative accessories which are attached to a vehicle to give the vehicle an enhanced and special appearance. In particular, the present invention relates to the field of attachments adjacent to the wheels of a vehicle to enhance the appearance of the vehicle.

2. Description of the Prior Art

In general, decorative attachments to a vehicle are known in the prior art. However, to the best of the inventor's knowledge, there are no prior art attachments adjacent to a vehicle's wheel which can spin freely of the rotation of the wheel to provide an enhanced appearance even after the vehicle has come to a stop.

SUMMARY OF THE INVENTION

The present invention is a decorative spinner which is attached adjacent the wheel of a vehicle so that it covers the wheel hub like a hubcap. The spinner has a base plate which covers the hubcap and by which the spinner is retained adjacent the wheel and a shaft rotatably supported on the base plate. The shaft in turn rotatably supports a central hub having a multiplicity of spinner blades. When the vehicle is in motion, the base plate rotates and the spinner blades rotate relative to the base plate to provide a doubly pleasing effect. When the vehicle is stopped, the spinner blades can continue to rotate.

It has been discovered, according to the present invention, that if a spinner assembly has a base by which it is attached adjacent to the wheel of a vehicle and a shaft rotatably supported on the base and which in turn rotatably supports a spinner assembly having spinner blades, then when the vehicle is in motion, the base rotates and the spinner blades can rotate relative to the base to provide a doubly pleasing effect. In addition, the spinner blades can continue to rotate even after the vehicle is stopped.

It is therefore an object of the present invention to provide a spinner assembly that has a base by which it is attached adjacent to the wheel of a vehicle and a shaft rotatably supported on the base and which in turn rotatably supports a spinner assembly having spinner blades, so that when the vehicle is in motion, the base rotates and the spinner blades can rotate relative to the base to provide a doubly pleasing effect. In addition, the spinner blades can continue to rotate even after the vehicle is stopped.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a decorative self propelled spinner attachment which is designed to be attached adjacent to a wheel of a vehicle, such as a press fit between the vehicle's wheel hub and wheel rim, in a manner which permits the fan blades of the spinner to spin freely when the vehicle is in motion and also spin freely even when the vehicle is stopped.

Figure 1A:
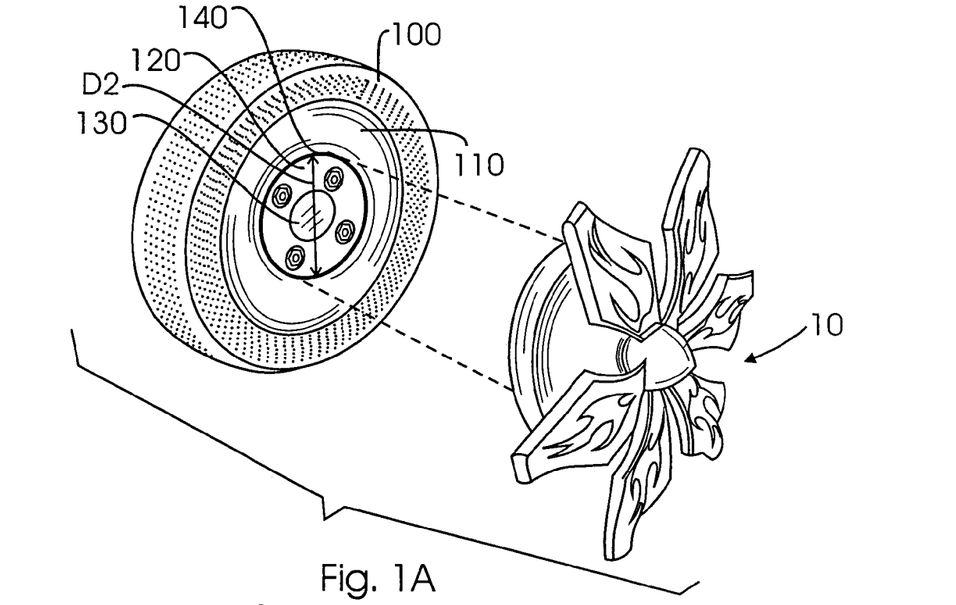
FIG. 1A is an exploded view of the present invention decorative spinner attachment showing how it will be positioned between the hub and wheel rim of a vehicle.
Figure 1B:
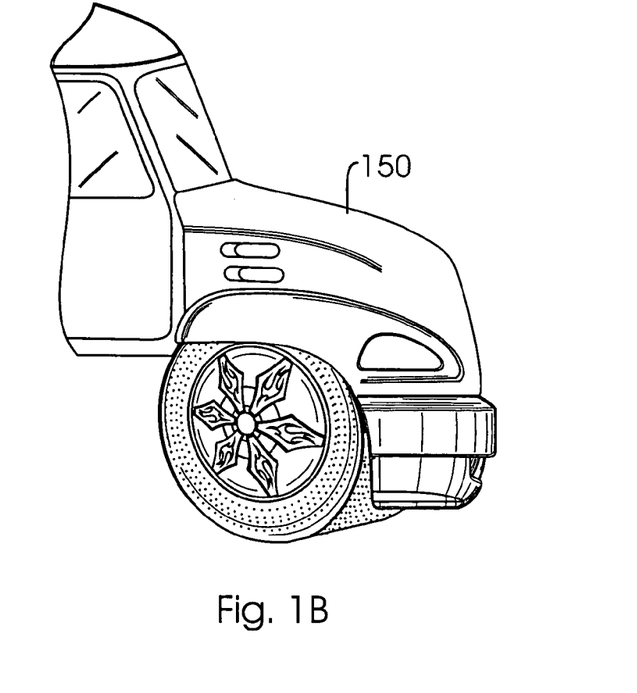
FIG. 1B is a perspective view of the present invention decorative spinner attachment attached to between the hub and wheel rim of a wheel of a vehicle.

Referring to FIG. 1, a wheel 100 is attached to a wheel rim 110 which in turn surrounds a wheel hub 120 which is turn surrounds and is connected to a vehicle axle 130. As the engine drives the axle 130, the axle rotates which in turn causes the wheel hub 120 to rotate and in turn causes the wheel rim 110 and wheel 100 to rotate. In conventional vehicles, a hubcap is retained by being press fitted at location 140 between the wheel hub 120 and wheel rim 130.

Referring to FIGS. 2A, 2B, 3, 4 and 5, the present invention decorative spinner attachment 10 includes a base plate 20 which by way of example is generally circular in shape. It will be appreciated that the base plate 20 can be any desired shaped. The diameter D1 of the base plate 20 is sufficiently large so that it covers the wheel hub 120 having a diameter of D2 like a hubcap and is press fit and retained at location 140 between the wheel hub 120 and wheel rim 110 as illustrated in FIG. 1. The base plate 20 has a hollow interior cavity 22 and a height H1 which permits the base plate 20 to cover a wheel hub which may extend outward from the wheel 100 such as in trucks and still be securely retained in a press fit at location 140 between the wheel hub 120 and wheel rim 110.

The base plate 20 has an upper surface 24 and an aligned interior upper surface 26 which forms the top of cavity 22 while base sidewall 28 having a height of H1 forms the circumferential sidewall of cavity 22. A central opening 30 extends through the upper surface 24 and aligned interior upper surface 26 and is surrounded by a multiplicity of small openings, such as three openings 32, 34 and 36. Extending through central opening 30 is a central spinner shaft 38. The spinner shaft 38 is connected to a spinner plate 40 through bearing 42 so that the shaft 38 can rotate within spinner plate 40. Spinner plate 40 is retained against the interior upper surface by three threaded bolts 44, 46 and 48 which have washers thereon to abut upper surface 24 and respective nuts 50, 52 and 54. Spinner plate 40 has three aligned openings: two of these openings 56 and 58 are visible in FIG. 2B. Bolt 46 extends through opening 32 and through opening 56 and is fastened by nut 52. Bolt 48 extends through opening 34 and opening 58 and is fastened by nut 54. Bolt 44 extends through opening 36, through the aligned opening in spinner plate 40 which is not visible and is fastened by nut 50. In this way, spinner shaft 38 extends through central opening 30 and spinner plate 40 is secured to the underside of the upper surface of the base plate 20, as illustrated in the cross-sectional view of FIG. 5.

Figure 2A:
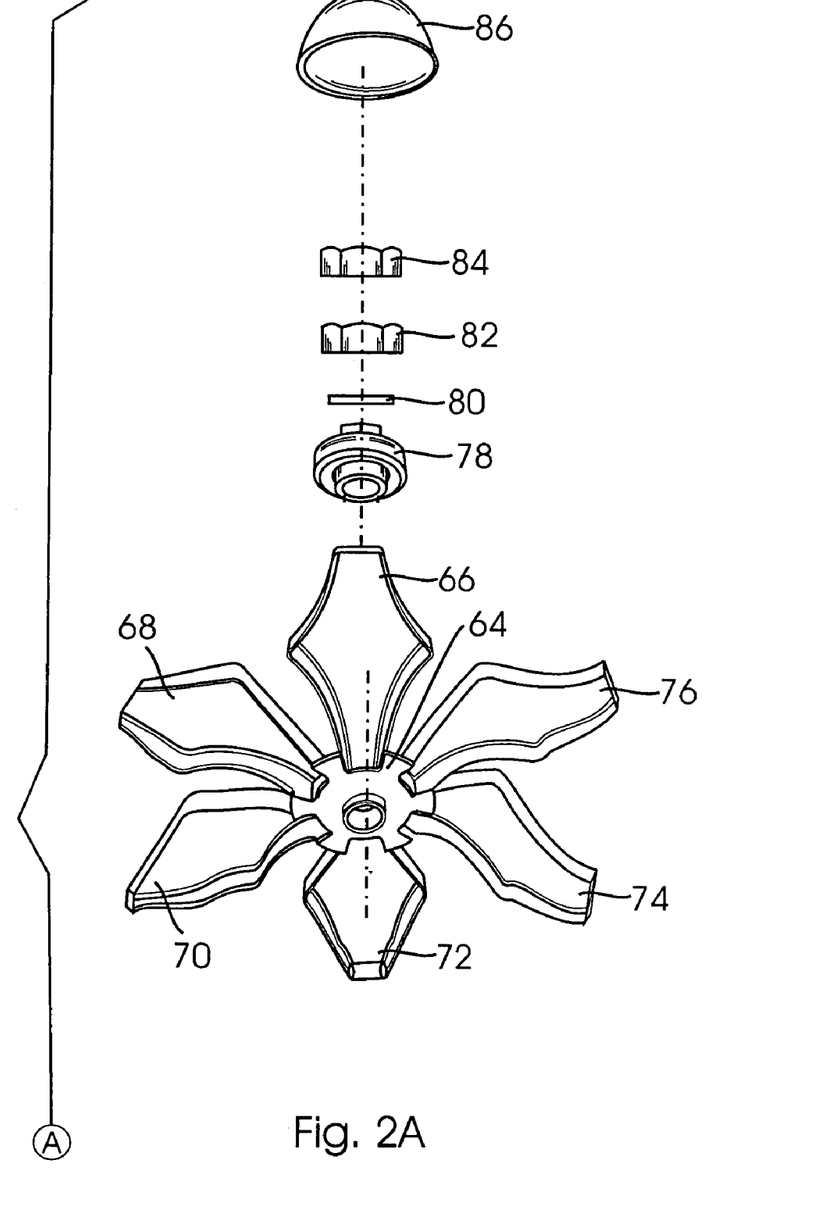
FIG. 2A is an exploded view of the upper portion of the decorative spinner assembly of the present invention.
Figure 2B:
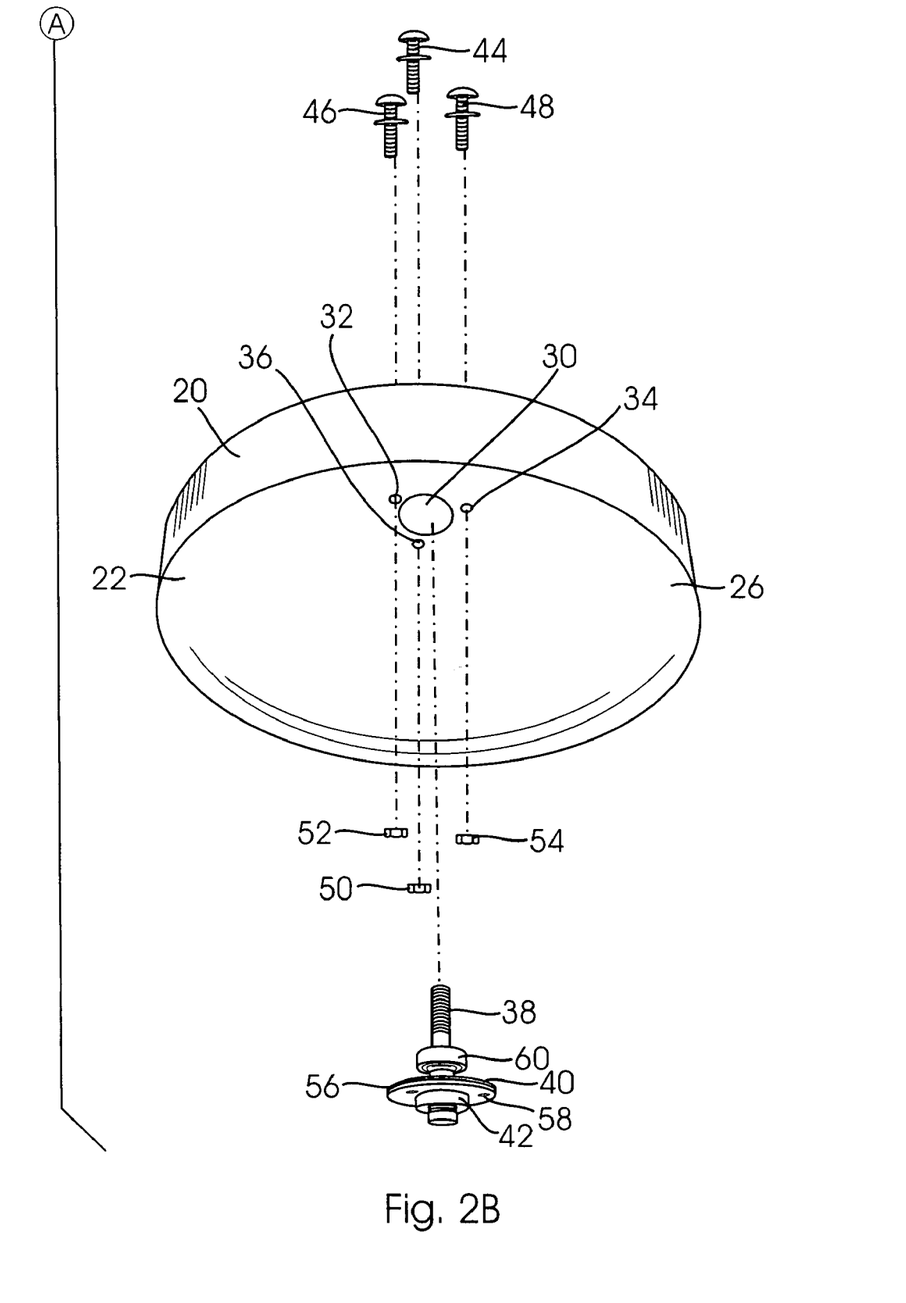
FIG. 2B is an exploded view of the lower base portion of the decorative spinner assembly of the present invention.
Figure 3:
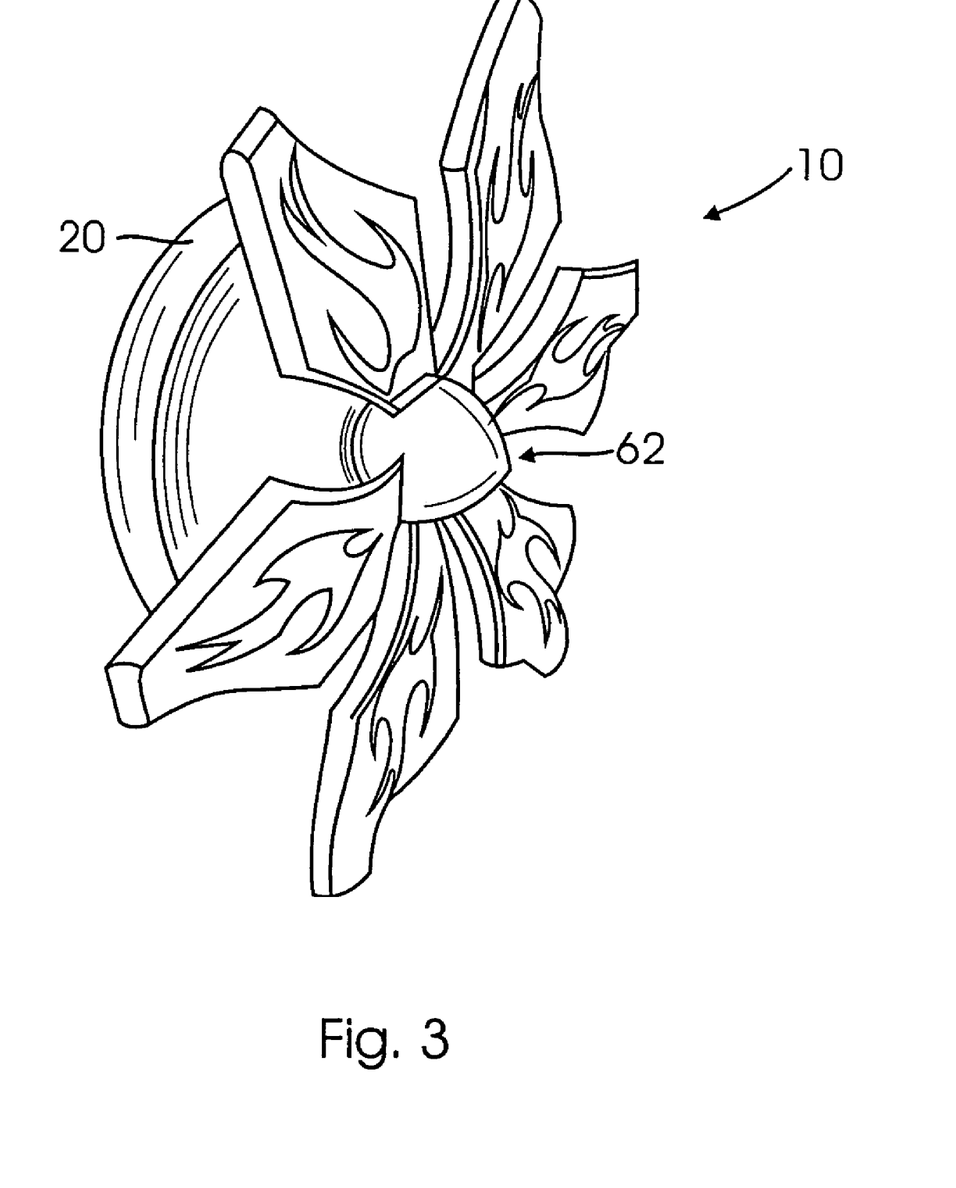
FIG. 3 is a perspective view of the present invention decorative spinner attachment.
Figure 4:
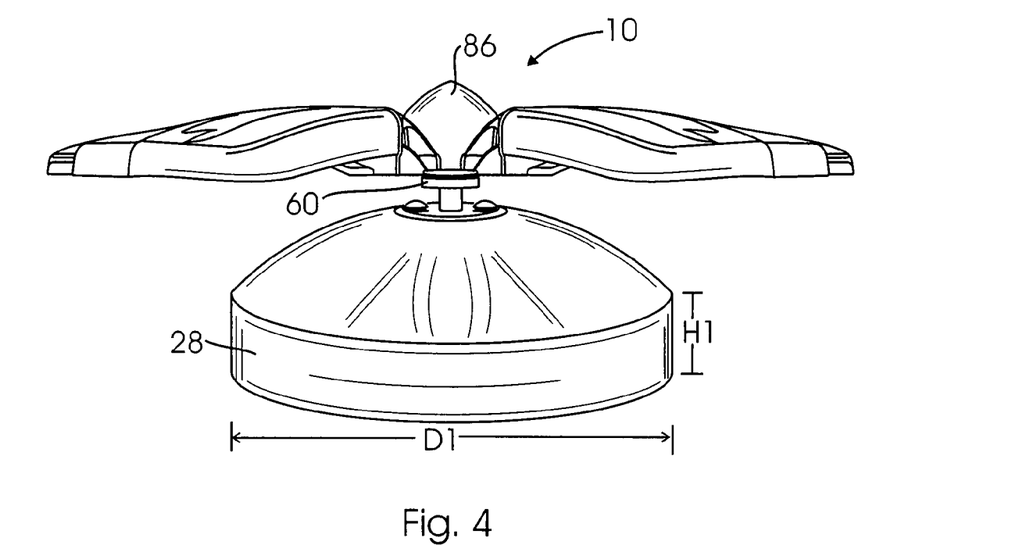
FIG. 4 is a side elevational view of the present invention decorative spinner attachment.
Figure 5:
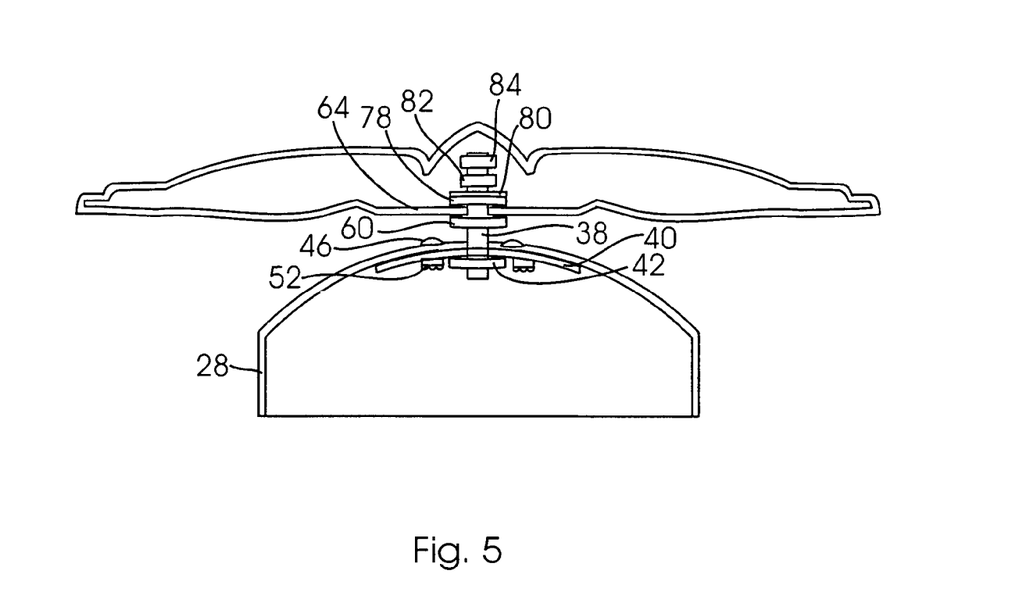
FIG. 5 is a side elevational cross-section view of the present invention decorative spinner attachment.
Figure 6A:
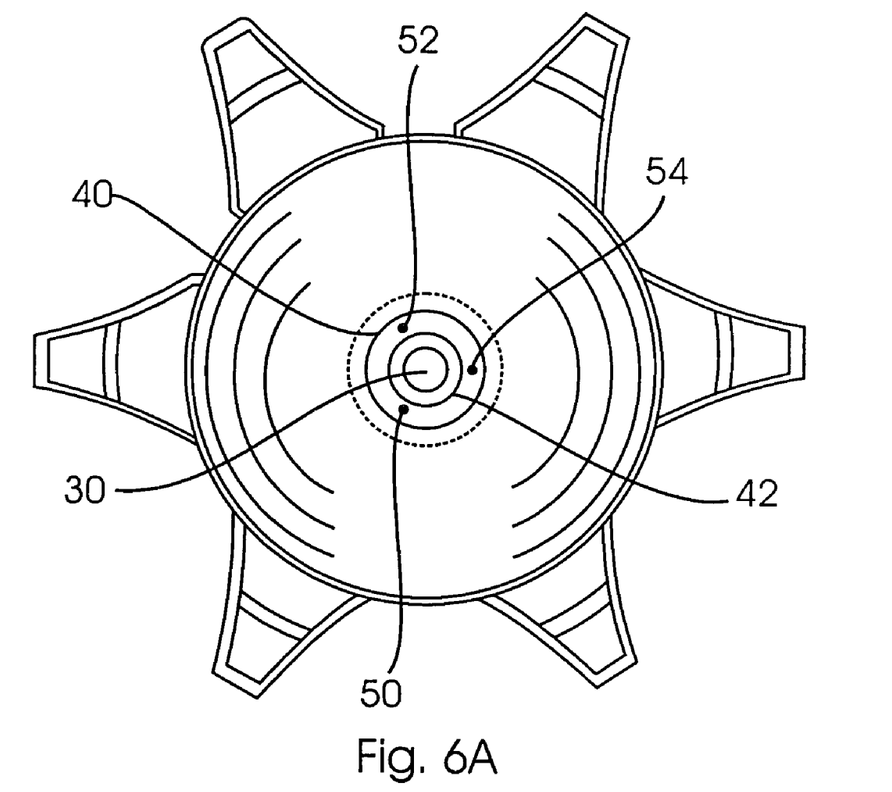
FIG. 6A is a rear plan view of the present invention decorative spinner attachment showing the attachment screws by which the shaft is rotatably attached to the base plate.
Figure 6B:
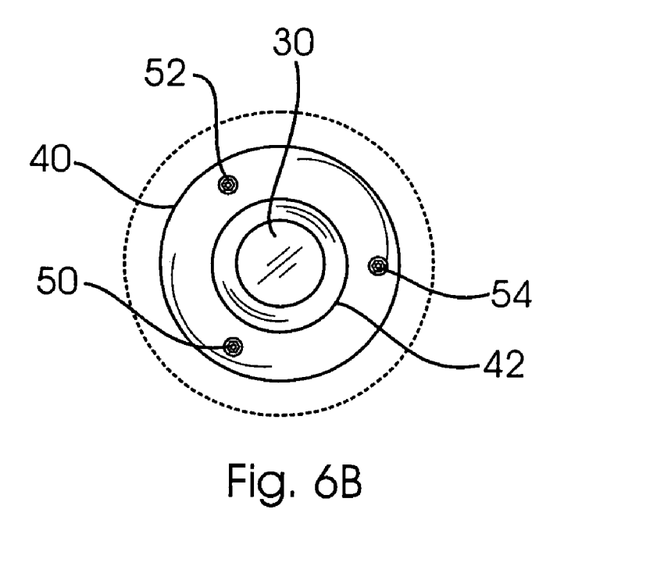
FIG. 6B is an enlarged view of the area of the attachment screws illustrated in FIG. 5A.

A second bearing 60 which is affixed to shaft 38 also extends through opening 30 and is positioned and attached to the fan or spinner assembly 62 so that the shaft 30 rotatably supports the fan or spinner assembly 62. The fan or spinner assembly 62 is comprised of a central hub 64 to which is attached a multiplicity of spinner or fan blades. By way of example, there is illustrated six spinner blades 66, 68, 70, 72, 74 and 76. It will be appreciated that any number of spinner blades are within the spirit and scope of the present invention. A third bearing 78 is positioned above central hub 64 and is interconnected with second bearing 60 which is positioned below central hub 64. Third bearing 78 is also affixed to shaft 30 and is secured thereto by washer 80 and two nuts 82 and 84. The assembly is covered by a spinner hubcap 86 which is locked in place on central hub 64.

As a result, the spinner assembly 62 is able to rotate about shaft 38 independently of the rotation of the base plate 20 which rotates with the wheel 100 of the vehicle 150. As a result, when the vehicle is in motion, the base plate 20 rotates with the wheel 100 as the wheel 100 rotates and the spinner assembly 62 rotates independently of the rotation of the base plate, to thereby provide a doubly pleasing effect of a dual rotation of the spinner blades 66, 68, 70, 72, 74 and 76 rotating relative to the base plate 20. When the vehicle 150 is stopped, even though the base plate 20 also stops rotating, the spinner assembly 62 and its spinner blades can continue to rotate since it is connected to bearings 60 and 78 which enables the spinner assembly 62 and its fan blades 66, 68, 70, 72, 74 and 76 to rotate about shaft 38 while shaft 38 can rotate within base plate 20 and its affixed plate 40 by virtue of bearing 42

Figure 7:
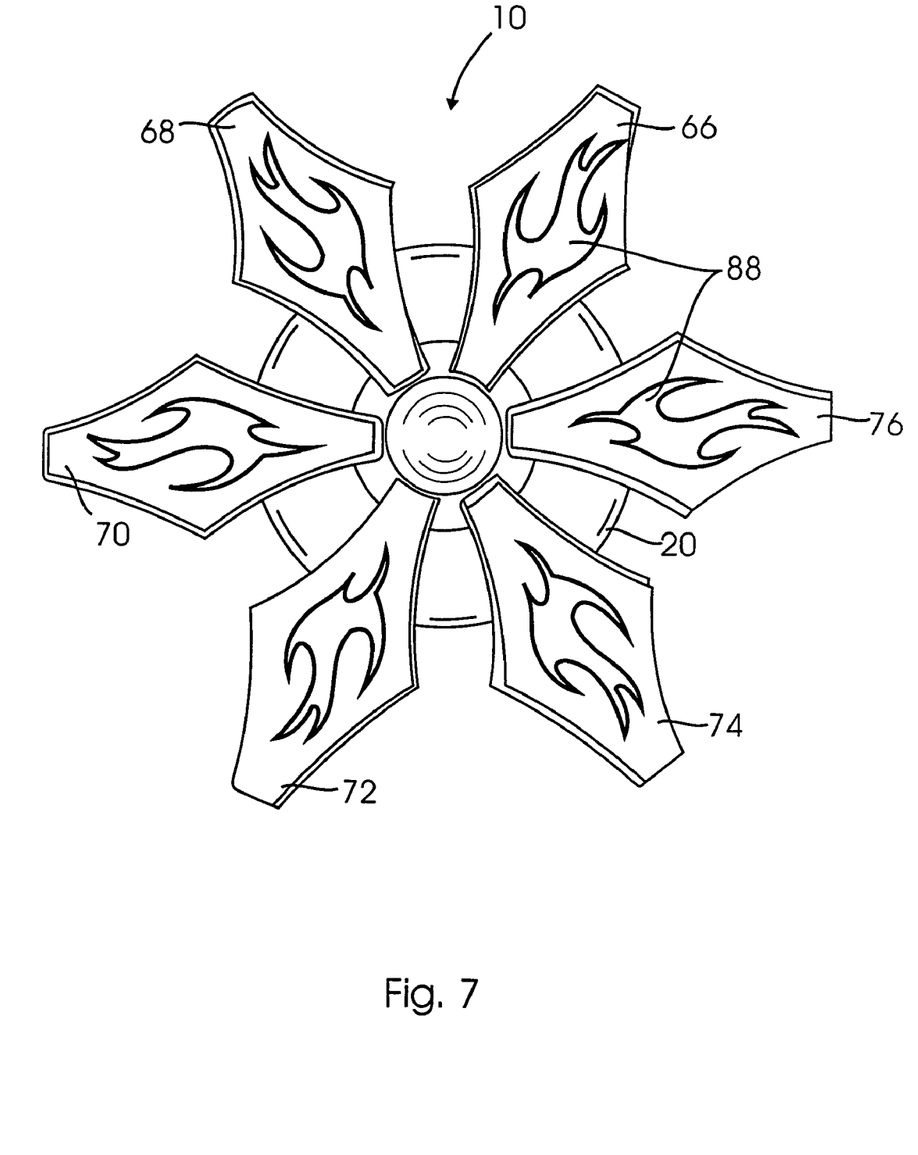
FIG. 7 is a front plan view of the present invention decorative spinner attachment.

As illustrated in FIG. 7, to enhance the beauty of the spinner, decorations 88 can be molded into the spinner blades or can be affixed by means such as decals. The blades 66, 68, 70, 72, 74 and 76 can have any multiplicity of unique shapes to further enhance the aesthetic beauty of the spinner.

The spinner 10 can be made of any type of material but preferably is made of metal. It can also be made of any type of strong hard plastic material.

Defined in detail, the present invention is a spinner for attachment to a vehicle having a multiplicity of wheels with each wheel attached through a respective wheel rim to a wheel hub having a given diameter which wheel hub rotates when the vehicle is in motion, each spinner comprising: (a) a base plate having an upper surface and a circumferential sidewall which define an interior chamber, the circumferential sidewall having a given height and diameter sufficient to cover the wheel hub, the upper surface having a centrally disposed opening and a multiplicity of small openings around the central opening; (b) a spinner shaft rotatably connected to a spinner plate by a first bearing, the spinner plate affixed to the interior of the upper surface of the base plate by a multiplicity of threaded bolts which respectively extend through a respective small opening in the upper surface of the base plate and through an aligned opening in the spinner plate and is respectively affixed by a nut, the spinner shaft extending through the opening and above the upper surface of the base plate; (c) a spinner assembly including a central hub having a multiplicity of spinner blades attached thereto, the central hub having a central opening through which the spinner shaft extends, the spinner shaft having a second bearing positioned below the central hub and an interlocking third bearing positioned above the central hub so that the central hub can rotate relative to the shaft, the third bearing secured within the spinner by a washer and at least one nut on the spinner shaft, a spinner hubcap affixed to the central hub and enclosing the third bearing and upper portion of the spinner shaft; and (d) the spinner shaft rotatable within the spinner plate and the central hub and the multiplicity of spinner blades rotatable around the spinner shaft, and the base plate fit over the wheel hub and press fit between the wheel hub and the wheel rim like a hubcap so that when the vehicle is in motion, the base plate rotates and the spinner blades rotate relative to the base plate, and when the vehicle is stopped, the spinner blades can continue to rotate.

Defined broadly, the present invention is a spinner for attachment to a vehicle having a multiplicity of wheels with each wheel attached through a respective wheel rim to a wheel hub which rotates when the vehicle is in motion, each spinner comprising: (a) a base plate having an upper surface and a circumferential sidewall which define an interior chamber having dimensions sufficient to cover the wheel hub, the upper surface having a centrally disposed opening; (b) a spinner shaft rotatably connected to a spinner plate, the spinner plate affixed to the interior of the upper surface of the base plate so that spinner shaft extends through the central opening and above the base plate; (c) a spinner assembly including a central hub having a multiplicity of spinner blades attached thereto, the central hub having a central opening through which the spinner shaft extends, the spinner shaft having rotation means interconnecting the central hub with the spinner shaft so that the central hub can rotate relative to the spinner shaft, a spinner hubcap affixed to the central hub and enclosing the upper portion of the spinner shaft; and (d) the spinner shaft rotatable within the spinner plate and the central hub and the multiplicity of spinner blades rotatable around the spinner shaft, and the base plate fit over the wheel hub and retained adjacent a wheel so that when the vehicle is in motion, the base plate rotates and the spinner blades rotate relative to the base plate, and when the vehicle is stopped, the spinner blades can continue to rotate.

Defined more broadly, the present invention is a spinner for attachment to a vehicle having a multiplicity of wheels with each wheel surrounding a wheel hub which rotates when the vehicle is in motion, each spinner comprising: (a) a base plate having an upper surface and a circumferential sidewall which define an interior chamber having dimensions sufficient to cover the wheel hub, the upper surface having a centrally disposed opening; (b) a spinner shaft rotatably connected to the base plate so that spinner shaft extends through the central opening and above the base plate; (c) a spinner assembly including a central hub having a multiplicity of spinner blades attached thereto, the central hub having a central opening through which the spinner shaft extends, the spinner shaft having rotation means interconnecting the central hub with the spinner shaft so that the central hub can rotate relative to the spinner shaft; and (d) the spinner shaft rotatable within the base plate and the multiplicity of spinner blades rotatable around the spinner shaft, and the base plate fit over the wheel hub and retained adjacent a wheel so that when the vehicle is in motion, the base plate rotates and the spinner blades rotate relative to the base plate, and when the vehicle is stopped, the spinner blades can continue to rotate.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A spinner hubcap assembly for attachment to a vehicle having a multiplicity of wheels with each wheel attached through a respective wheel rim to a wheel hub having a given diameter which wheel hub rotates when the vehicle is in motion, each spinner hubcap assembly comprising:
   a. a base plate having an axially outer surface and a circumferential sidewall which define an interior chamber, the circumferential sidewall having a given height and diameter sufficient to cover the wheel hub, the axially outer surface having a centrally disposed opening and a multiplicity of small openings around the central opening;
   b. a spinner shaft rotatably connected to a spinner plate by a first bearing, the spinner plate affixed to the interior of the axially outer surface of the base plate by a multiplicity of threaded bolts which respectively extend through a respective small opening in the axially outer surface of the base plate and through an aligned opening in the spinner plate and is respectively affixed by a nut, the spinner shaft extending through the opening and axially outward of the axially outer surface of the base plate;
   c. a spinner assembly including a central hub having a multiplicity of spinner blades attached thereto, the central hub having a central opening through which the spinner shaft extends, the spinner shaft having a second bearing positioned axially inward of the central hub and an interlocking third bearing positioned axially outward of the central hub so that the central hub can rotate relative to the shaft, the third bearing secured within the spinner by a washer and at least one nut on the spinner shaft, a spinner hubcap affixed to the central hub and enclosing the third bearing and axially outward portion of the spinner shaft; and
   d. the spinner shaft rotatable within the spinner plate and the central hub and the multiplicity of spinner blades rotatable around the spinner shaft, and the base plate fit over the wheel hub and press fit between the wheel hub and the wheel rim so that when the vehicle is in motion, the base plate rotates and the spinner blades rotate relative to the base plate, and when the vehicle is stopped, the spinner blades can continue to rotate.

2. A spinner in accordance with claim 1 wherein the multiplicity of spinner blades are six spinner blades.

3. A spinner in accordance with claim 1 wherein each spinner blade has decorative markings thereon.

4. A spinner in accordance with claim 1 wherein each spinner is made of metal.

5. A spinner hubcap assembly for attachment to a vehicle having a multiplicity of wheels with each wheel attached through a respective wheel rim to a wheel hub which rotates when the vehicle is in motion, each spinner hubcap assembly comprising:
   a. a base plate having an axially outer surface and a circumferential sidewall which define an interior chamber having dimensions sufficient to cover the wheel hub, the axially outer surface having a centrally disposed opening;
   b. a spinner shaft rotatably connected to a spinner plate, the spinner plate affixed to the interior of the axially outer surface of the base plate so that the spinner shaft extends through the central opening and axially outward of the base plate;
   c. a spinner assembly including a central hub having a multiplicity of spinner blades attached thereto, the central hub having a central opening through which the spinner shaft extends, the spinner shaft having a second bearing positioned axially inward of the central hub and an interlocking third bearing positioned axially outward of the central hub so that the central hub can rotate relative to the shaft, the third bearing secured within the spinner by a washer and at least one nut on the spinner shaft, a spinner hubcap affixed to the central hub and enclosing the third bearing and axially outward portion of the spinner shaft; and
   d. the spinner shaft rotatable within the spinner plate and the central hub and the multiplicity of spinner blades rotatable around the spinner shaft, and the base plate fit over the wheel hub and retained on a wheel so that when the vehicle is in motion, the base plate rotates and the spinner blades rotate relative to the base plate, and when the vehicle is stopped, the spinner blades can continue to rotate.

6. A spinner in accordance with claim 5 wherein the multiplicity of spinner blades are six spinner blades.

7. A spinner in accordance with claim 5 wherein each spinner blade has decorative markings thereon.

8. A spinner in accordance with claim 5 wherein each spinner is made of metal.

9. A spinner hubcap assembly for attachment to a vehicle having a multiplicity of wheels with each wheel surrounding a wheel hub which rotates when the vehicle is in motion, each spinner hubcap assembly comprising:
   a. a base plate having an axially outer surface and a circumferential sidewall which define an interior chamber having dimensions sufficient to cover the wheel hub, the axially outer surface having a centrally disposed opening;
   b. a spinner shaft rotatably connected to a spinner plate by a first bearing, the spinner plate affixed to the interior of the outer surface of the base plate by a multiplicity of threaded bolts which respectively extend through a respective small opening in the axially outer surface of the base plate and through an aligned opening in the spinner plate and is respectively affixed by a nut, the spinner shaft extending through the opening and axially outward of the axially outer surface of the base plate;
   c. a spinner assembly including a central hub having a multiplicity of spinner blades attached thereto, the central hub having a central opening through which the spinner shaft extends, the spinner shaft having rotation means interconnecting the central hub with the spinner shaft so that the central hub can rotate relative to the spinner shaft, a spinner hubcap affixed to the central hub and enclosing the axially outward portion of the spinner shaft; and d. the spinner shaft rotatable within the spinner plate and the central hub and the multiplicity of spinner blades rotatable around the spinner shaft, and the base plate fit over the wheel hub and retained on a wheel so that when the vehicle is in motion, the base plate rotates and the spinner blades rotate relative to the base plate, and when the vehicle is stopped, the spinner blades can continue to rotate.

10. A spinner in accordance with claim 9 wherein the multiplicity of spinner blades are six spinner blades.

11. A spinner in accordance with claim 9 wherein each spinner blade has decorative markings thereon.

12. A spinner in accordance with claim 9 wherein each spinner is made of metal.

* * * * *